(12) United States Patent
Manku (10) Patent No.: US 8,590,790 B1
(45) Date of Patent: Nov. 26, 2013

(54) METHOD AND APPARATUS FOR GENERATING DEDICATED DATA CHANNELS IN BACKSCATTER RFID SYSTEMS

(75) Inventor: Tajinder Manku, Waterloo (CA)

(73) Assignee: Tag-Comm Inc., Waterloo (CA)

( * ) Notice: Subject to any disclaimer, the term of this patent is extended or adjusted under 35 U.S.C. 154(b) by 12 days.

(21) Appl. No.: 13/470,709

(22) Filed: May 14, 2012

(51) Int. Cl.
*H04B 1/59* (2006.01)

(52) U.S. Cl.
USPC .......................................... 235/439; 455/121

(58) Field of Classification Search
USPC .......................................... 235/439; 455/121
See application file for complete search history.

(56) References Cited

U.S. PATENT DOCUMENTS 6,920,315 B1 * 7/2005 Wilcox et al. ................ 455/121

FOREIGN PATENT DOCUMENTS

| EP | 0 851 599 A1 | 7/1998 |
|---|---|---|
| EP | 0 899 682 A2 | 3/1999 |
| EP | 1 646 155 A1 | 4/2006 |

OTHER PUBLICATIONS

International Search Report and Written Opinion, Mailed Feb. 6, 2013, for Corresponding PCT International Patent Application No. PCT/CA2012/000567.
Gay, et al, "An Ultra-Low-Power Sensor Interface Built Around a Reconfigurable Incremental Sigma-Delta Modulator for Sensor Networks Employing Electromagnetic Backscatter", IEEE Circuits and Systems, 2008.

\* cited by examiner

*Primary Examiner* — Daniel Hess
(74) *Attorney, Agent, or Firm* — Gowling Lafleur Henderson LLP (57) ABSTRACT

An antenna apparatus for backscattering an incoming radio frequency (RF) signal includes an antenna for backscattering the incoming RF signal in accordance with a reflection coefficient characteristic of the antenna. A variable impedance circuit includes an output electrically connected to the antenna. A low pass delta sigma modulator is coupled to the variable impedance circuit and digitally controls the output of the variable impedance circuit, such that the reflection coefficient of the antenna is adjusted based on the output of the variable impedance circuit.

21 Claims, 7 Drawing Sheets

METHOD AND APPARATUS FOR GENERATING DEDICATED DATA CHANNELS IN BACKSCATTER RFID SYSTEMS

FIELD OF THE INVENTION

The present invention relates generally to a method and apparatus for generating dedicated data transmission channels in backscatter radio frequency communication networks.

BACKGROUND OF THE INVENTION

Radio Frequency Identification (RFID) systems are commonly used to locate and track items in a near-field communication network including a reader device and at least one wireless terminal, or tag. Energized time-varying electromagnetic radio frequency (RF) waves, which comprise the carrier signal, are transmitted from the reader to the tags in a given RFID network or system. Tags use backscatter technology to reflect the reader's RF signal back to the reader, modulating the signal to encode and transmit data.

Figure 1:
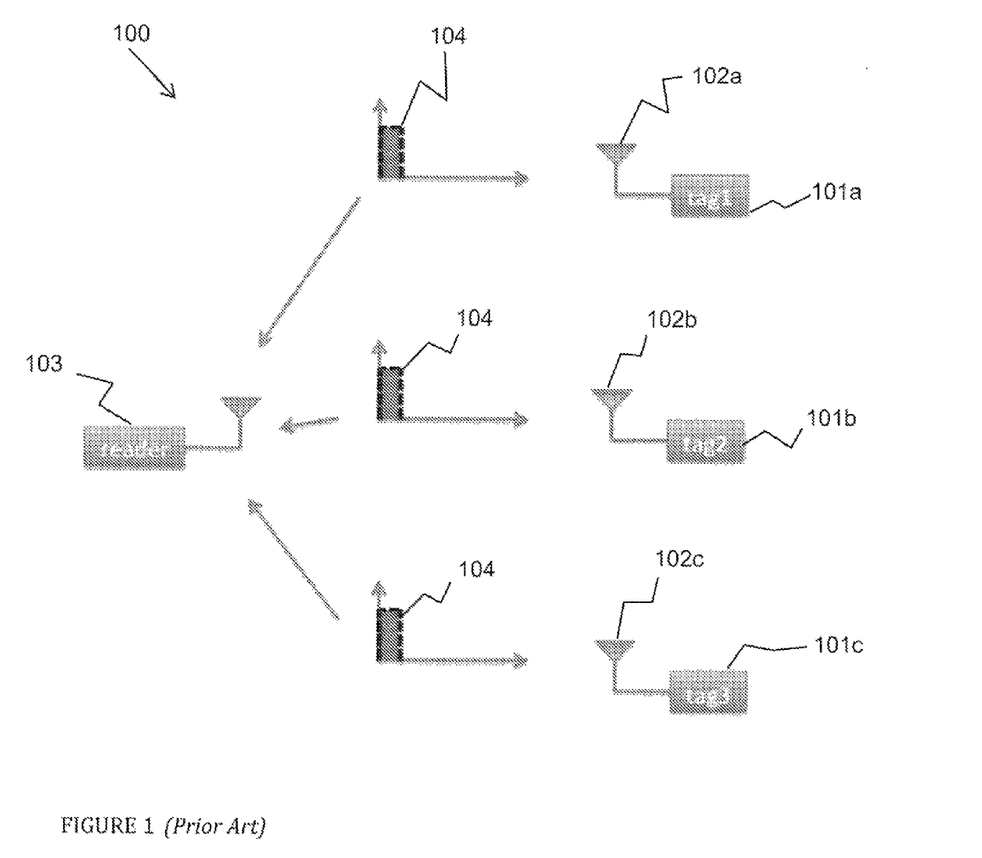
FIG. 1 shows a prior art RFID system in which data transmission from tag to reader is performed on a same frequency channel.

FIG. 1 depicts a prior art RFID system in which data transmission from tags 101a-c to reader device 103 is performed on a same frequency channel or spectrum 104. Using the established backscattering technology, each of the plurality of tags typically in the RFID system or network sends RF signals on the same backscattered carrier signal. Hence, the backscattered RF signals from each tag overlap those of other tags within the same RF spectrum associated with that given reader device/RFID network.

As a consequence, tag collision in RFID systems occur when the multiple tags are energized by the same RFID reader device, and simultaneously reflect their respective, overlapping signals back to the reader using the given frequency channel. Thus the tag collision problem is exacerbated whenever a large number of tags must be read together in the same RF field. The reader is unable to differentiate these signals when the simultaneously generated signals collide. The tag collisions confuse the reader, generate data transmission errors, and generally reduce data throughput within the RFID system or network.

Various systems have been proposed to isolate individual tags. For example, in one technique aimed at reducing collision errors, when the reader recognizes that tag collision has taken place, it sends a special "gap pulse" signal. Upon receiving this signal, each tag consults a random number counter to determine the interval to wait before sending its data. Since each tag gets a unique number interval, the tags send their data at different times. The adverse impact on overall RFID system performance, in terms of data throughput rate, however, still exists.

Modulating the signal received by the tag and re-radiating the modulated signal backscattered to the reader device is known, using such signal modulation schemes, such as phase shift keying (PSK) and amplitude shift keying (ASK), where the tag changes its reflection coefficient by changing the impedance match between states. However, the adverse effects of tag collisions resulting from overlapping backscattered signals on a given frequency channel still remain.

SUMMARY OF THE INVENTION

Provided is an antenna apparatus for backscattering an incoming radio frequency (RF) signal. The antenna apparatus comprises an antenna for backscattering the incoming RF signal in accordance with a reflection coefficient characteristic of the antenna, a variable impedance circuit having an output electrically connected to the antenna, and at least one low pass delta sigma ($\Delta\Sigma$) modulator coupled to the variable impedance circuit and digitally controlling the output of the variable impedance circuit, wherein the reflection coefficient ($\Gamma$) of the antenna is adjusted based on the output of the variable impedance circuit.

In one embodiment, an output of the at least one low pass delta sigma modulator switches the output of the variable impedance circuit between two states to adjust the reflection coefficient.

In another embodiment, an input signal applied to the low pass delta sigma modulator consists of one of a complex modulation signal offset from the incoming radio frequency signal by $+/-\omega_o$.

The complex modulation signal may consists of any of a GMSK, QPSK, nPSK, nQAM, and an OFDM signal.

In yet another embodiment, the antenna apparatus further comprises at least a second low pass delta sigma modulator coupled to the variable impedance circuit, wherein the output of the variable impedance circuit is further digitally controlled by the second low pass delta sigma modulator.

In a further embodiment, input signals to the first and second low pass delta sigma modulators of the antenna apparatus comprise in-phase (I) and quadrature (Q) signals respectively.

BRIEF DESCRIPTION OF THE DRAWINGS

The invention will now be described by way of example only with reference to the following drawings in which:

FIG. 5b shows a representative output signal of the SSB signals generated using the modulator apparatus of FIG. 5a;

FIG. 8b shows a representative output of the GMSK signal generated using the modulator apparatus of FIG. 5a;

FIG. 8c shows a representation of quadrature errors which may be produced in a reflected signal generated using the modulator apparatus of FIG. 5a;

DETAILED DESCRIPTION

The term modulation as used herein refers to the process by which the radio frequency identification (RFID) wireless terminal, or tag, changes the carrier radio frequency (RF) signal of the reader antenna to convey information. For instance, in phase modulation, data being transmitted from the reader device to the tag is encoded in changes in the phase of the carrier wave sent out by the RFID reader device.

Figure 2:
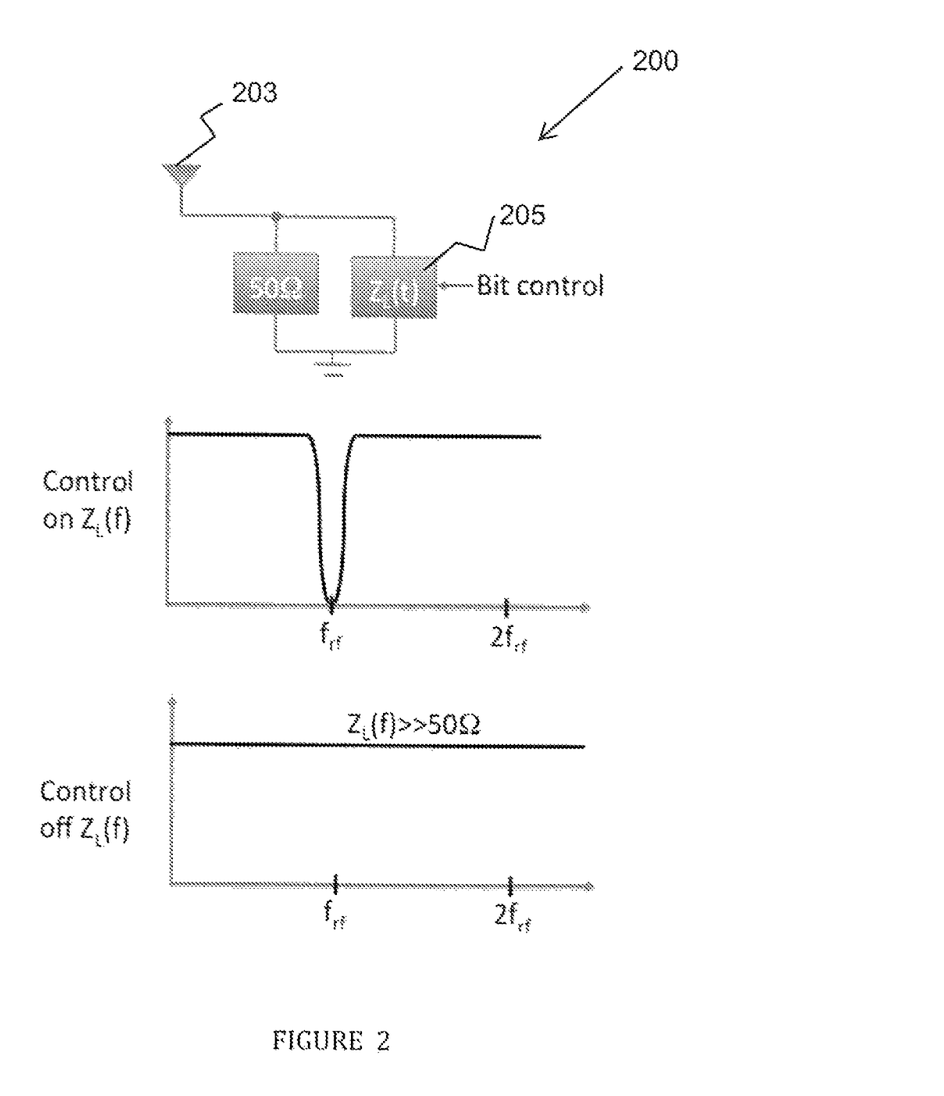
FIG. 2 shows, in one embodiment, an apparatus for generating the varying impedance for backscattering.

FIG. 2 shows, in one embodiment, an antenna apparatus 200 in a wireless communication system, such as a radio frequency identification (RFID) communication network, which may be passive or semi-passive, for generating a varying impedance 205 at antenna 203 for backscattering an incoming radio frequency (RF) signal, such as from a reader device of the RFID network. Antenna 203, which may be part a tag terminal of the RFID communication network, backscatters the incoming RF signal in accordance with its reflection coefficient (Γ) characteristic.

Still with regard to FIG. 2, illustrated is one embodiment for designing the varying impedance circuit 205 used to generate the backscattering wave from the antenna 203. Here the impedance $Z_L$ is switched between two states depending on the control bit. When the control bit is high $Z_L$ looks like zero impedance at $f_{rf}$, hence the backscattering $\Gamma(f_{rf})=1$. Note that $Z_L$ is designed to have a high impedance other than $f_{rf}$. At $2f_{rf}$ the impedance helps to reduce folding of $2f_{rf}$. When the control is low, $Z_L \gg 50$ ohms. Therefore $\Gamma=0$, and no signal is back scattered.

The varying impedance can also be designed to produce a phase shift in the backscattered wave. That is, $$\Gamma_i = \alpha e^{j\phi_i}$$

where ϕ has two states, $\phi_1$ and $\phi_2$ and α is a constant The back scattering impedance is then given by:

$$z_i = \frac{z_s(1+\alpha e^{j\phi_i})}{(1-\alpha e^{j\phi_i})}$$

where ZL has two states, $Z_1$ and $Z_2$. Here $\phi_i$ can be designed to have states $\phi_1=0°$ and $\phi_2=180°$. Here, $Z_s$ is the impedance of the antenna. Since the antenna impedance adjusts given its environment, the effective Γ is simply rotated and scaled. This can be illustrated by assuming Zs changes to $Z_s\beta\exp(j\phi)$ where β is the scaling factor and ϕ is the rotation. Therefore, Γ changes to:

$$\Gamma = \frac{Z - Z_s\beta e^{j\varphi}}{Z + Z_s\beta e^{j\varphi}}$$

Or, $$\Gamma = \frac{Z\beta^{-1}e^{-j\varphi} - Z_s}{Z\beta^{-1}e^{-j\varphi} - Z_s}$$

Given this, a change in $Z_s$ results in scaling and rotating Z by $\beta^{-1}$ and −ϕ, respectively. In this complex modulation scheme, phase changes in r rather than amplitude changes may be utilized.

In an embodiment, a one filter or more filters may be in the variable impedance circuit to filter out of band noise output from the low pass delta sigma modulator.

Figure 3:
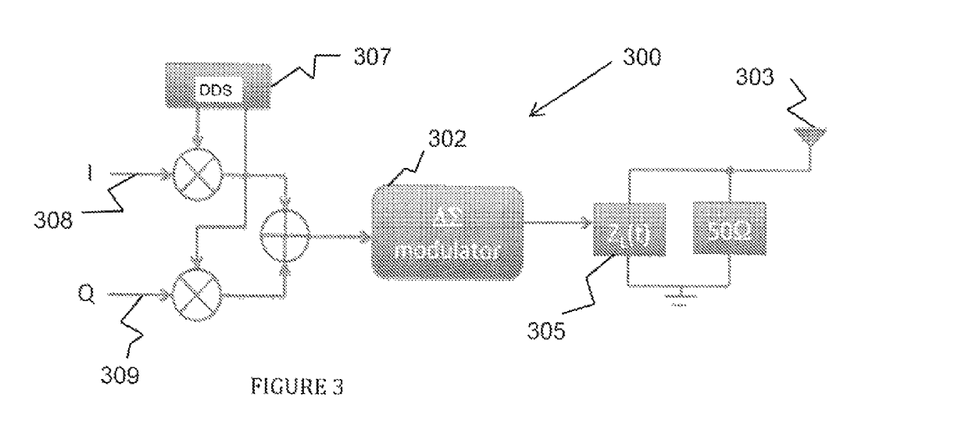
FIG. 3 shows, in one embodiment, an apparatus for generating an IQ signal offset by the frequency of a digital signal source such as a Direct Digital Synthesizer.

FIG. 3 shows, in one embodiment, apparatus 300 for generating an In-Phase-Quadrature (IQ) signal (308, 309) offset by the frequency of a digital signal source which in one embodiment may be Direct Digital Synthesizer (DDS) 307. A low pass delta sigma (ΔΣ) modulator 302 may be applied to generate a complex modulation signal. As referred to herein, the low pass delta sigma modulator generates an output bit stream that represents the input data from a DC level to some predetermined design bandwidth, BW. Beyond the predetermined design bandwidth BW, quantized noise of the low pass delta sigma increases until at some design cutoff point, the signal would be deemed to have too much quantization noise.

Still with regard to FIG. 3, the signals to the mixers are generated by DDS 307.

Figure 4:
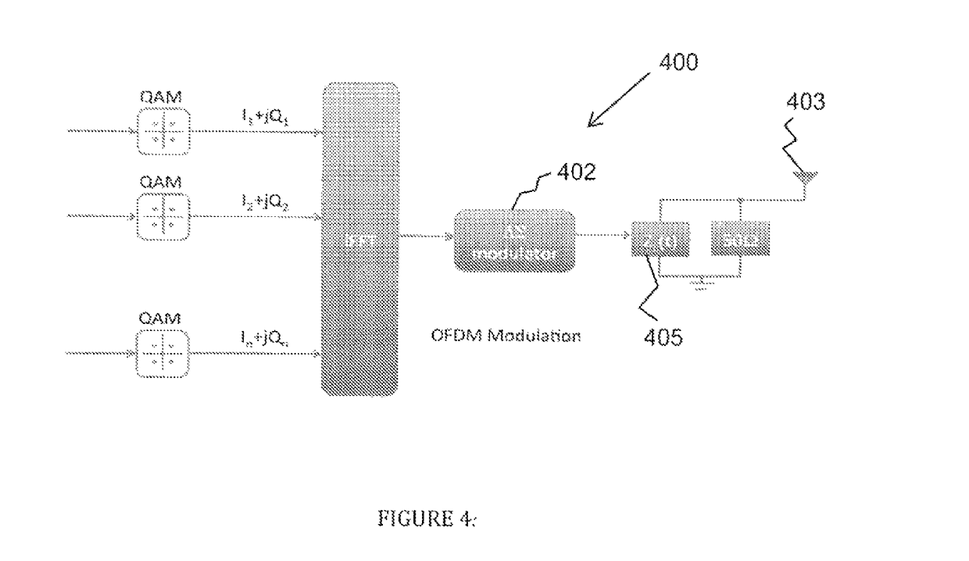
FIG. 4 shows, in one embodiment, an apparatus for generating an OFDM signal offset by the frequency of a digital signal source such as a Direct Digital Synthesizer.

FIG. 4 shows, in one embodiment, apparatus 400 for generating an orthogonal frequency division multiplexing (OFDM) signal offset by the frequency of a digital signal source.

In the examples of FIGS. 3 and 4, the complex modulation signals are generated at $f_{rf}\delta f$ and $f_{rf}\delta f$; i.e. they are double side banded and have a lower and upper side band.

Figure 5A:
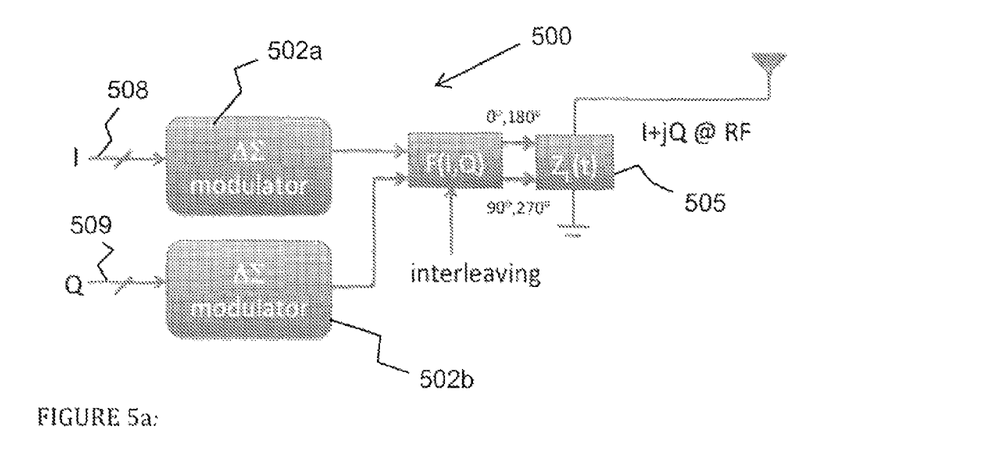
FIG. 5a shows, in one embodiment, a modulator apparatus for generating interleaved SSB signals based on IQ signal inputs.

FIG. 5a shows, in one embodiment, modulator apparatus 500 for generating interleaved SSB signals based on IQ signal inputs 508,509.

Single side band (SSB) signals can also be generated, but two low pass ΔΣ modulators 502a, 502b are required. The two ΔΣ modulators 502a, 502b provide signals that either change Γ by 0, 90, 180, or 270° (or in general offset+0, offset+90, offset+180, or offset+270); see FIG. 5a. The input signals to the first and second low pass delta sigma modulators 502a, 502b may comprise in-phase (I) and quadrature (Q) signals 508, 509 respectively. In one embodiment, the input signal applied to the low pass delta sigma modulators 502a, 402b consists of a complex modulation signal offset from the incoming radio frequency signal by +$\omega_o$ or −$\omega_o$ or zero.

Still in regard to FIG. 5a, the first ΔΣ (i.e. $(\Delta\Sigma)_I$) has an output that either changes Γ by 0 or 180° and the other ΔΣ (i.e. $(\Delta\Sigma)_Q$) by 90 or 270°. However, the outputs are interleaved, alternately switching between the first ΔΣ and the second ΔΣ. So if $(\Delta\Sigma)_I$ generates 0, 180, 180, 0, 0, 180 . . . and $(\Delta\Sigma)_Q$ generates 90, 90, 270, 270, . . . then Γ is controlled to change by 0, 90, 180, 90, 180, 270, 0, 270, . . . . . By using this architecture SSB signals may be generated.

Figure 5B:
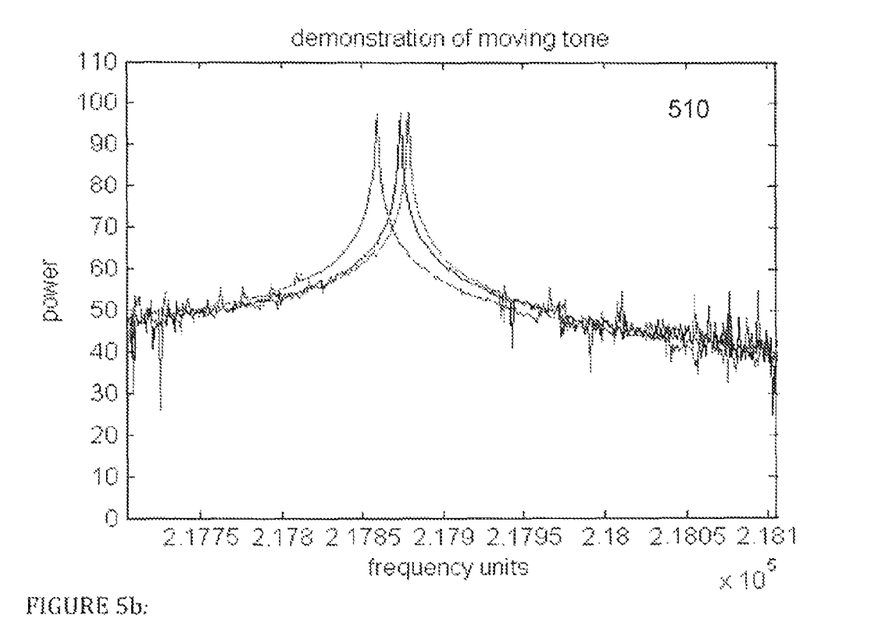

FIG. 5b shows a representative output signal 510 of the SSB signals generated using the modulator apparatus 500 of FIG. 5a. FIG. 5b shows the output of such a structure where the signal applied to it is sin $\omega_{bb}t$ and cos $\omega_{bb}t$ to the $(\Delta\Sigma)_I$ and $(\Delta\Sigma)_Q$ modulator, respectively. Here $\omega_{bb}$ is being changed to three different frequencies.

The impedance corresponding to the phases may be determined via the equations above. For example if α=1/sqrt(2), ϕ=0, 90, 180, 270, $f_{rf}=1$ GHz, $Z_s=50\Omega$, the impedances become 50+100j, 10+20j, 10−20j, and 50−100j, respectively.

If there are any errors in Z, this will result in an effective IQ offset in the reflected signal. However, this can be corrected within the reader device using known IQ correction schemes. If the antenna impedance changes, one can apply equalization on the RFID reader.

Figure 6:
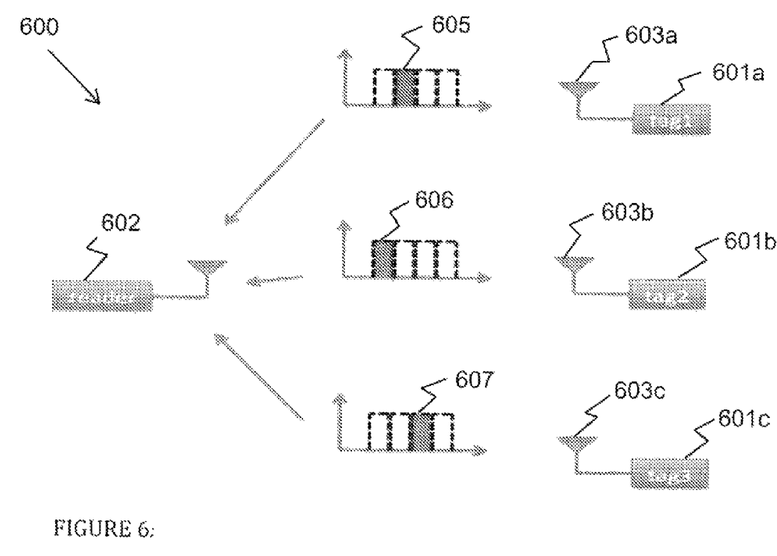
FIG. 6 shows an embodiment of an RFID system in which data transmission, via backscatter from tag to reader, is performed on dedicated frequency channels.

FIG. 6 shows an embodiment of an RFID communication network 600 in which data transmission, via backscatter from tag to reader, is performed on dedicated frequency channels using the complex modulation apparatus and method for low pass delta sigma modulation, by generating separate channels 605, 606, 607 for each of the tags 601a-c used in the RFID communication network 600. The complex modulation method and apparatus for low pass delta sigma modulation are herein referred to, and denoted, as "the Γ−ΔΣ scheme". An antenna 603a-c in respective ones of tag terminals 601a-c backscatters the incoming RF signal, such as from reader device 602, in accordance with a reflection coefficient characteristic of the antenna 603a-c. A variable impedance circuit (not shown in FIG. 6) has an output electrically connected to the antenna 603a-c. A low pass delta sigma modulator is coupled to an input of the variable impedance circuit to digitally control the output of the variable impedance circuit, such that reflection coefficient Γ of antenna 603a-c may be adjusted by changing the output of the variable impedance circuit.

Figure 7:
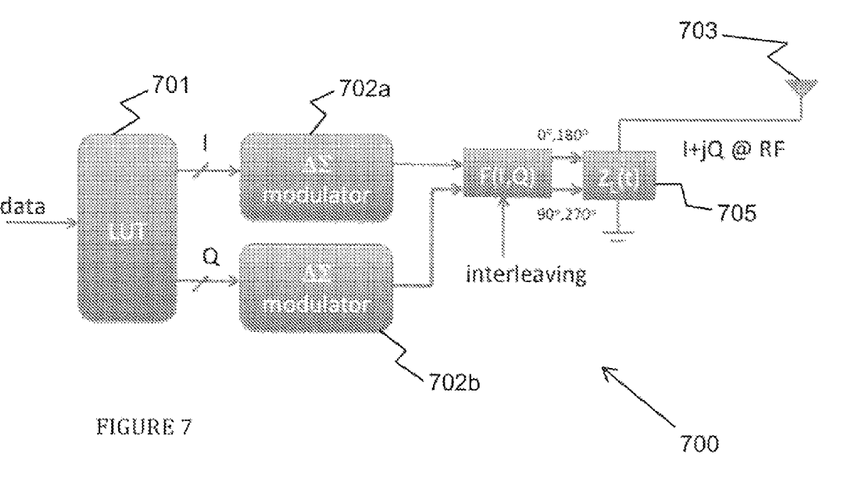
FIG. 7 shows, in one embodiment, an apparatus for generating a QAM signal.

FIG. 7 shows, in one embodiment, modulator apparatus 700 for generating quadrature amplitude (QAM) signals. Data bits are applied to LUT (Look Up Table) 701 and then applied to the ΔΣ modulator 702a, 702b.

Figure 8A:
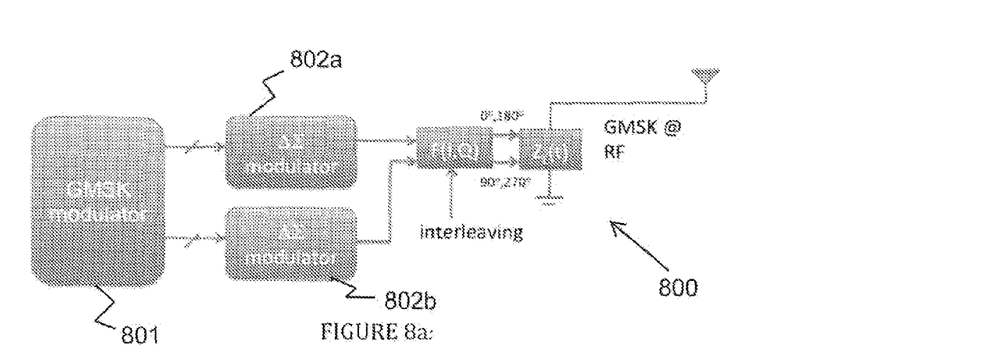
FIG. 8a shows, in one embodiment, a modulator apparatus for generating a GMSK signal.

FIG. 8a shows, in one embodiment, modulator apparatus 800 for generating a Gaussian minimum shift keying (GMSK) signal. By applying the SSB scheme, complex modulation signals like GMSK, nPSK, quadrature phase shift keying (QPSK), OFDM, nQAM, etc. may be generated, where n represents an integer.

In one embodiment, the output of the low pass delta sigma modulators 802a-b may be a return to zero (RTZ), so if the data is 1101101, the output would be 10100010100010; note there is a zero between each bit. In an alternate embodiment, the output of low pass delta sigma modulator 802a-b may be a non-return to zero (NRZ) type signal; for example, if the data is 1101101, the output is 1101101, and nothing is added to the data stream.

Figure 8B:
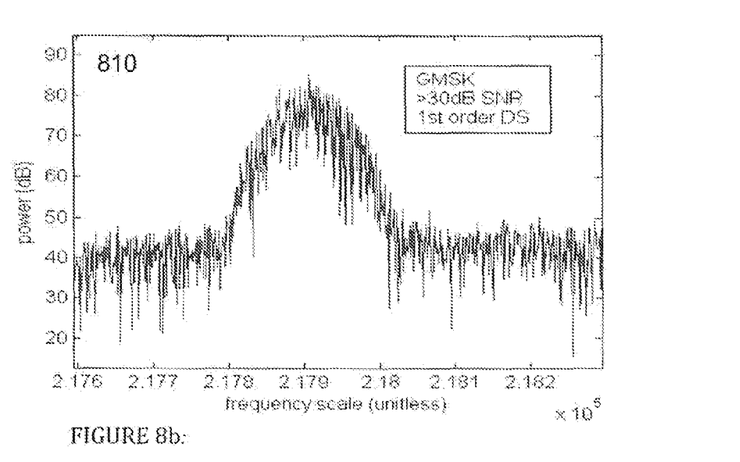

FIG. 8b shows a representative output of the GMSK signal generated using modulator apparatus 800 of FIG. 8a. Here, a first order ΔΣ is used. One can easily improve the spectrum by applying a higher order ΔΣ modulator. The center frequency is 2.179 normalized units. The phases of the reflection coefficient may have errors; i.e. $\sigma_o \exp(j0°)$, $(\Gamma_o+\epsilon_1)\exp(j(180°+\phi_1)$, $(\Gamma_o+\epsilon_2)\exp(j(90°+\phi_2)$, and $(\Gamma_o+\epsilon_3)\exp(j(270°+\phi_3)$, where $\epsilon_1$, $\phi_1$, $\epsilon_2$, $\phi_2$, $\epsilon_3$, and $\phi_3$ represent the errors. These errors produce a quadrature error in the signal reflected back by the antenna.

Figure 8C:
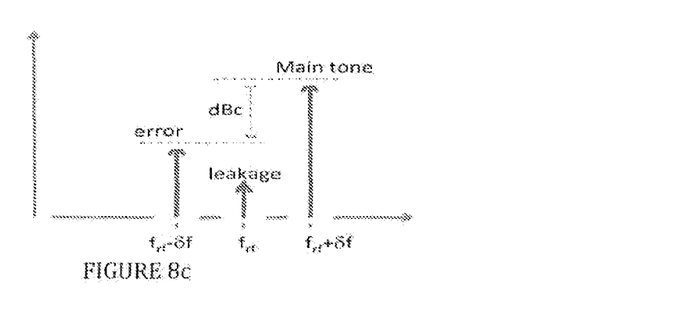

FIG. 8c is a representation of the reflected signal if a SSB is generated at an offset of δf. The error tone at −δf is produced due to this error; ideally the error signal would not exist. This quadrature error can be corrected by adjustments either (i) to the I and Q signals applied to the low pass delta sigma modulators, or (ii) within the reader of the RFID communication network itself.

For instance, in the reader what is measured is $E(Q^2)-E(I^2)$ and $E(IQ)$, where $E(x)$ is the average expected value. The term $E(Q^2)-E(I^2)$ is a measure of the gain mismatch, and $E(IQ)$ is a measure of the phase mismatch. The gain on the I (or Q) channel may be corrected until $E(Q^2)-E(I^2)=0$, and the phase so $E(IQ)=0$. This may be done in a closed loop scheme, for example using a Least Mean Square filter.

The matrix that is used:

$I$corrected$=I*D$ $Q$corrected$=\sin(\text{phase\_error})*I+\cos(\text{phase\_error})*Q$ where D is a measure of the gain mismatch between I and Q, and phase_error is the error in phase between I and Q. Without any error, D=1 and phase_error=0°.

With regard to the clocking function utilized by the wireless tag terminal, such as for driving the low pass delta sigma modulator, generation of the clocking function may be provided by a clock circuit within the tag reader, or via a clock circuit generation based on the frequency of the incoming RF signal provided by the reader device of the RFID network.

For example, in the instance of using the signal from the read as the clock, if the reader is at frf, the clock used by the tag will frf, or some frequency, frf/N, where N is some integer (that is frf is divided by N to generate a clock).

Figure 9A:
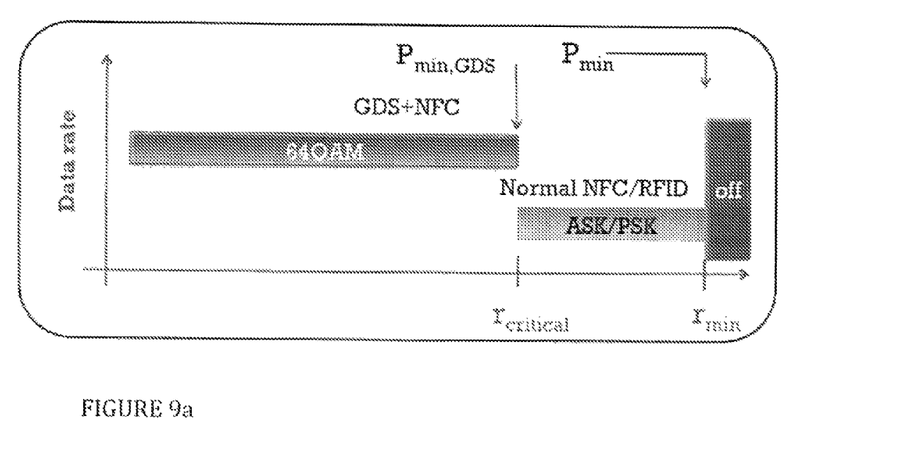
FIG. 9a shows a representation of controlling data rate versus power.

FIG. 9a shows a representation of controlling data rate versus power. A power management system may be introduced that depends on the data rate and the modulation type based on the distance between the tag and the reader, r. As the reader gets close enough (i.e. $r<r_{min}$) the tag gets enough power to turn on. From $r_{min}$ to $r_{critical}$ the tag transmits using a slow clock and ASK or PSK. As $r<r_{critical}$ the tag can start transmitting using 64QAM. For RF backscattering technology, the power received by the tag (i.e. $P_{RX}(r)$) is given by:

$$P_{RX}(r) = \left(\frac{\lambda}{4\pi r}\right)^2 P_{TX} G_{TX} G_{RX}$$

where λ is the wavelength of the carrier signal, r is the distance between the tag and the reader, $P_{TX}$ is the power of the transmitter, $G_{TX}$ is the antenna gain of the reader, and $G_{RX}$ is the antenna gain of the tag. The modulated power from the tag is then received by the reader.

Figure 9B:
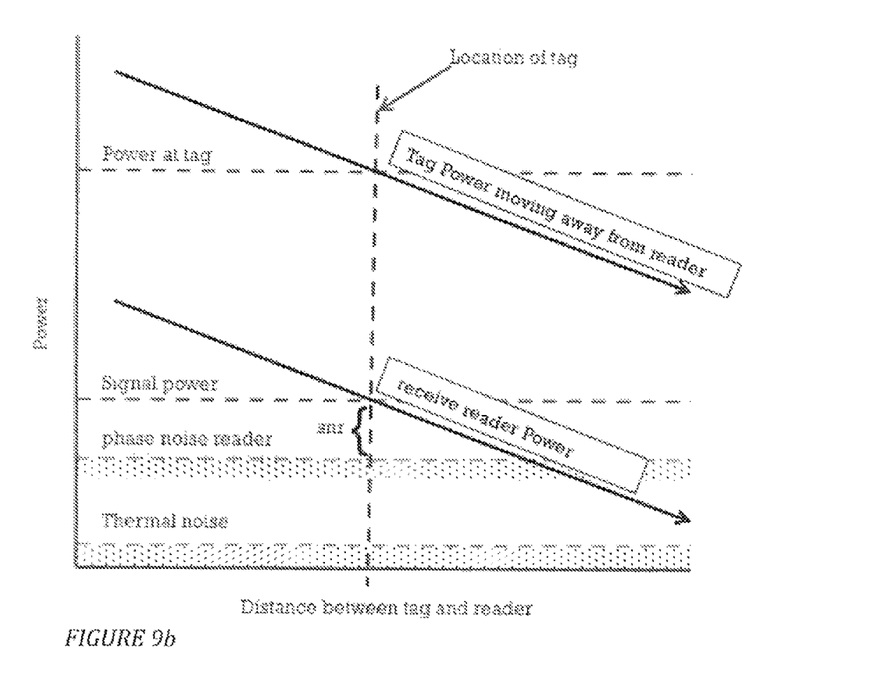
FIG. 9b shows a representation of link budget versus distance between tag and reader.

FIG. 9b shows a representation of link budget versus distance between tag and reader. The link budget between the tag and reader is shown as a function of the tag-reader distance. The power received by the tag is decreased as the tags moves further away form the reader. At some such position, the backscatter power of the tag is attenuated as it travels back to the reader. The signal to noise ratio (SNR) is given by the power received by the reader over the phase noise of the oscillator within the reader.

For example, since the power coming from the reader falls off as $(1/r^2)$ the complex modulation technology may be applied when the reader is closer. As the reader gets further, lower modulations can be used. It is understood that application of the complex modulation requires a higher SNR and more power.

Although preferred embodiments of the invention have been described herein with regard to passive and semi-passive RFID communication networks, it is contemplated, and indeed it will be understood by those skilled in the art, that the solutions presented herein may be applied to other aspects of wireless communication. Accordingly, a person of ordinary skill in the art would understand that the specific embodiments described herein, while illustrative are not necessarily comprehensive. Thus, other various modifications may be made those skilled in the art without departing from the scope of the invention as defined by the claims.

What is claimed is:

1. An antenna apparatus for backscattering an incoming radio frequency (RF) signal comprising:
   an antenna for backscattering the incoming RF signal in accordance with a reflection coefficient characteristic of the antenna;
   a variable impedance circuit having an output electrically connected to the antenna; and
   at least one low pass delta sigma (ΔΣ) modulator coupled to the variable impedance circuit and digitally controlling the output of the variable impedance circuit;
   wherein the reflection coefficient (Γ) of the antenna is adjusted based on the output of the variable impedance circuit.

2. The antenna apparatus of claim 1 wherein an output of the at least one low pass delta sigma modulator switches the output of the variable impedance circuit between two states to adjust the reflection coefficient.

3. The antenna apparatus of claim 1 wherein an input signal applied to the low pass delta sigma modulator consists of one of a complex modulation signal offset from the incoming radio frequency signal by $+/-\omega_o$.

4. The antenna apparatus of claim 3 wherein the complex modulation signal consists of one of a GMSK, QPSK, nPSK, nQAM, and an OFDM signal.

5. The antenna apparatus of claim 1 wherein an output of the low pass delta sigma modulator is one of a return to zero (RTZ) and a non-return to zero (NRZ) type signal.

6. The antenna apparatus of claim 1 further comprising at least a second low pass delta sigma modulator coupled to the variable impedance circuit, wherein the output of the variable impedance circuit is further digitally controlled by the at least a second low pass delta sigma modulator.

7. The antenna apparatus of claim 6 wherein input signals to the first and second low pass delta sigma modulators comprise in-phase (I) and quadrature (Q) signals respectively.

8. The antenna apparatus of claim 7 wherein the I and Q signals are adjusted to compensate for errors that may arise in generating $\Gamma_o\exp(j0°)$, $\Gamma_o\exp(j180°)$, $\Gamma_o\exp(j90°)$, and $\Gamma_o\exp(j270°)$.

9. The antenna apparatus of claim 8 wherein the errors are compensated for in a radio frequency identification (RFID) reader device electromagnetically coupled to the antenna.

10. The antenna apparatus of claim 6 wherein a combined output of the first and second said low pass delta sigma modulators switches the output of the variable impedance circuit between four states to adjust the reflection coefficient of the antenna.

11. The antenna apparatus of claim 10 wherein the reflection coefficient comprises four states which are relative from each other by $\Gamma_o\exp(j0°)$, $\Gamma_o\exp(j180°)$, $\Gamma_o\exp(j90°)$, and $\Gamma_o\exp(j270°)$.

12. The antenna apparatus of claim 11 wherein the first said low pass delta sigma modulator $((\Delta\Sigma)_I)$ switches the states between 0 degrees and 180 degrees.

13. The antenna apparatus of claim 12 wherein the second low pass delta sigma modulator $((\Delta\Sigma)_Q)$ switches the states between 90 degrees and 270 degrees.

14. The antenna apparatus of claim 13 wherein outputs of the first and second low pass delta sigma modulators alternately switch between each other, wherein if $(\Delta\Sigma)_I$ generates 0, 180, 180, 0, 0, 180 . . . and $(\Delta\Sigma)_Q$ generates 90, 90, 270, 270, . . . , $\Gamma$ is controlled to adjust by 0, 90, 180, 90, 180, 270, 0, 270, . . . .

15. The antenna apparatus of claim 6 wherein the input signals applied to the low pass delta sigma modulators comprise sine and cosine wave forms offset from a frequency of the incoming RF signal by $\phi_1$, where $\omega_1$ can be either positive or negative.

16. The antenna apparatus of claim 6 wherein the input signals applied to the low pass delta sigma modulators consists of a complex modulation signal offset from a frequency of the incoming RF signal by one of $+\omega_o$, $-\omega_o$ and zero.

17. The antenna apparatus of claim 16 wherein the complex modulation signal consists of one of a GMSK, nPSK, QPSK, nQAM, and OFDM signal.

18. The antenna apparatus of claim 6 wherein outputs of the low pass delta sigma modulators consist of one of a return to zero (RTZ) and a non-return to zero (NRZ) type signal.

19. The antenna apparatus of claim 1 further comprising at least one filter device at the variable impedance circuit to filter out of band noise output from the at least one low pass delta sigma modulator.

20. The antenna apparatus of claim 1 wherein the antenna apparatus is included a tag terminal of a radio frequency identification (RFID) system including a reader device, wherein the antenna apparatus is activated for backscattering RF signals only when the tag terminal is within a predetermined critical distance of the reader device.

21. The antenna apparatus of claim 1 wherein the antenna comprises part of a tag terminal, the tag terminal electromagnetically coupled to a reader device within a radio frequency identification (RFID) system, the RFID system comprising clocking the low pass delta sigma modulator, generation of the clocking consisting of one of a clock circuit within the tag reader and a clock circuit generated based on a frequency of the incoming RF signal.

* * * * *